（12） United States Patent
Hilemon et al.

(10) Patent No.: US 10,313,443 B2
(45) Date of Patent: Jun. 4, 2019

(54) INTERCOMMUNICATION FOR ASSET HEALTH MONITORING DEVICES (71) Applicant: Computational Systems, Inc., Knoxville, TN (US)

(72) Inventors: Christopher G. Hilemon, Knoxville, TN (US); Anthony J. Hayzen, Knoxville, TN (US); William L. Sells, Knoxville, TN (US); Trevor D. Schleiss, Austin, TX (US); Manikandan Janardhanan, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 429 days.

(21) Appl. No.: 15/218,205

(22) Filed: Jul. 25, 2016

(65) Prior Publication Data

US 2017/0104825 A1 Apr. 13, 2017

Related U.S. Application Data (60) Provisional application No. 62/239,452, filed on Oct. 9, 2015.

(51) Int. Cl.
*H04L 29/08* (2006.01)
*H04L 29/06* (2006.01)
*G06Q 10/00* (2012.01)

(52) U.S. Cl.
CPC ............ *H04L 67/12* (2013.01); *G06Q 10/20* (2013.01); *H04L 67/2823* (2013.01); *H04L 69/08* (2013.01); *Y02P 90/86* (2015.11)

(58) Field of Classification Search
CPC ..... H04L 67/12; H04L 67/2823; H04L 69/08; H04L 67/10; H04L 67/1008; G06Q 10/20; G06Q 10/10

USPC ......................................................... 709/219
See application file for complete search history.

(56) References Cited

U.S. PATENT DOCUMENTS

| 2007/0053374 A1* | 3/2007 | Levi ................... H04L 12/6402 370/431 |
| 2009/0080408 A1* | 3/2009 | Natoli ..................... H04L 45/00 370/351 |
| 2015/0319219 A1* | 11/2015 | Cummings ............. H04L 67/10 709/201 |

OTHER PUBLICATIONS

"System Manual MMS 6000, Operating Manual, Shaft Vibration Monitor MMS 6110," epro GmbH, Jöbkesweg 3, D-48599 Gronau, Germany, Sep. 12, 2007.

* cited by examiner

*Primary Examiner* — Tu T Nguyen
(74) *Attorney, Agent, or Firm* — Luedeka Neely Group, P.C.

(57) ABSTRACT

An extensible computing system integrates asset health data and user control of devices made by different manufacturers, using a common computer platform application structure and a common platform services structure. A services bus communicates device signals in a standardized format from the common platform services structure to a proprietary extension services structure, which converts the device communication signals from the standardized format to a proprietary communication format. A data highway bus communicates asset health and reliability data in a standardized data format from the proprietary extension services structure to the common extension services structure. The proprietary services structure converts asset health data from a proprietary data format as received from the proprietary device into the standardized data format. An input communicates data in the proprietary data format from the proprietary device to the computer, and an output sends communication signals in the proprietary communication format to the proprietary device.

15 Claims, 4 Drawing Sheets

| Asset View Services 304 | Asset Explorer Services 306 | User Mgmt Services 308 | System Services 310 | Ext Mgmt Services 312 |
|---|---|---|---|---|
| Messages, Asset Status, Notification | Classes, Libraries, Logical Hier., Network Hier., Search | ID Provider, Authentic., Authoriz., Permissions, Role/Group, ... | System Settings, Security Settings, Licensing | Content, Host Plugin, App Plugin, Localization |

| Logging Services 314 | Data Highway Services 316 | Route Services 318 | Logic Studio Services 320 | OPC UA Services 322 |
|---|---|---|---|---|
| Audit Trail Event | Data Highway, Host Services | Scheduler Vibration Calibration Oil ... | Logic Engine, Logic Scripts | |

INTERCOMMUNICATION FOR ASSET HEALTH MONITORING DEVICES

This application is a nonprovisional application claiming rights and priority on U.S. provisional patent application Ser. No. 62/239,452 filed 2015 Oct. 9. This invention relates to the field of asset health monitoring. More particularly, this invention relates to collecting and sharing asset data from and between different monitoring devices.

FIELD

Most assets require some type of servicing in order to be kept in operational condition. As used herein, the term "assets" is given a broad definition, and includes equipment such as might be found in industrial applications. Such assets, for example, include rotating assets such as pumps, presses, grinders, and generators, shop equipment, and other types of equipment.

In times past, an asset was serviced once it stopped working properly, such as by breaking down, or when it became readily apparent that it needed servicing, such as by making a noise, generating excessive heat, or not running smoothly. However, waiting until an asset breaks down before it is serviced tends to have many problems, such as collateral damage, inconvenience in the timing of the breakdown, work stoppages, injury to operators, the excessive costs associated with such, and so forth.

Predictive maintenance reduces many of those problems, at least in part, by monitoring the operation of the asset and providing service at a convenient time, such as when it starts to manifest signs of a problem.

Predictive maintenance typically involves gathering data on an asset, such as by using some kind of measurement device. Data from the asset can be gathered by the monitoring devices at planned intervals, randomly, or continuously. Different kinds of devices can monitor a given asset for properties such as vibration, temperature, pressure, valve position, sound, infrared emission, oil condition, pressure, flow rate, electrical consumption, and so forth. The devices used can be built into the asset, mounted to the asset, external to but dedicated to the asset, or be a general purpose device that is used to gather data from more than one asset, such as on a data collection route.

However, only rarely can a given device measure more than one or two of the desired asset properties or communicate one with another device. Further, monitoring and analysis programs designed to work with one device typically cannot work with another device, especially another device made by a different company. This can create issues such as duplicated data gathering, increased data analysis costs, and reduced data correlation.

What is needed, therefore, is a system that reduces issues such as those described above, at least in part.

SUMMARY

The above and other needs are met by an extensible computing system for integrating asset health data from monitoring devices made by different manufacturers, using a computer and program structures including a common platform application structure and a common platform services structure. A platform set of Application Programming Interfaces (API's) communicates device communication signals via a Data Source Interface (DSI), sometimes referred to as an Asset Source Interface (ASI), in a standardized format from the common platform services structure to a proprietary extension services structure. The proprietary extension services structure converts the device communication signals from the standardized format to a proprietary communication format that is understood by a proprietary device. A data highway bus communicates asset health and relatability data in a standardized data format from the proprietary extension services structure to the common extension services structure. The proprietary services structure converts asset health and relatability data from a proprietary data format as received from the proprietary device into the standardized data format. An input communicates data in the proprietary data format from the proprietary device to the computer, and an output sends communication signals in the proprietary device format to the proprietary device.

Some embodiments include a common platform applications structure for presenting the asset health and reliability data to a user and receiving commands from the user and generating associated device communication signals. Some embodiments include a common platform API set for communicating data and device communication signals between the common platform applications structure and the common platform services structure. In some embodiments the common platform applications structure includes at least one of an install structure, an asset view structure, an asset explorer structure, a user management structure, a system structure, an extension management structure, a logging structure, a data highway structure, a routing structure, a logic studio structure, and an OPC UA structure.

Some embodiments include a second proprietary extension services structure associated with a second proprietary type of device, a second proprietary data format, and a second proprietary device commination format, where the second proprietary extension services structure is in communication with the common platform services structure on the services bus and the data highway bus. Some embodiments include a proprietary API set for communicating data and device communication signals between the proprietary extension services structure and the proprietary asset health device. In some embodiments the common platform services structure includes at least one of an asset view services structure, an asset explorer services structure, a user management services structure, a system services structure, an extension management services structure, a logging services structures, a data highway services structure, a routing services structure, a logic studio services structure, and an OPC US services structure.

According to another aspect of the invention there is described a non-transient, computer-readable medium containing an extensible asset health program for enabling a computer to communicate with proprietary asset health monitoring devices. The program includes a common platform services program for establishing a services bus and a data highway bus. A selectively removable first proprietary extension services program is associated with a first proprietary API set, a first proprietary data format, a first proprietary communication format, and a first proprietary asset health monitoring device.

The first proprietary extension services program receives data from the first proprietary asset health monitoring device in the first proprietary data format using the first proprietary API set, converts the data from the first proprietary data format into a common data format, sends the data in the common data format to the common platform services program on the data highway bus, receives commands in a common command format from the common platform services program on the services bus, converts the commands from the common command format to the first proprietary command format, and sends the commands in the first proprietary command format to the first proprietary asset health device using the first proprietary API set.

A common platform applications program communicates with the common platform service program using a common platform API set, receives data in the common data format, originating from the first proprietary device and converted by the first proprietary services program, displays and analyzes the data, receives commands from a user for the first proprietary asset health device, and sends the commands in the common command format to the common platform services program for delivery to the first proprietary asset health device in the first proprietary command format.

Some embodiments according to this aspect of the invention also include a selectively removable second proprietary extension services program associated with a second proprietary API set, a second proprietary data format, a second proprietary command format, and a second proprietary asset health device, where the second proprietary extension services program is in communication with the common platform services program on the services bus and the data highway bus.

In some embodiments, the common platform applications program includes at least one of an install program, an asset view program, an asset explorer program, a user management program, a system program, an extension management program, a logging program, a data highway program, a routing program, a logic studio program, and an OPC UA program. In some embodiments, the common platform services program includes at least one of an asset view services program, an asset explorer services program, a user management services program, a system services program, an extension management services program, a logging services programs, a data highway services program, a routing services program, a logic studio services program, and an OPC UA services program.

According to yet another aspect of the invention there is described a method for enabling a computer to communicate with proprietary asset health devices, by providing a common platform services program for establishing a services bus and a data highway bus. Also provided is a selectively removable first proprietary extension services program associated with a first proprietary API set, a first proprietary data format, a first proprietary command format, and a first proprietary asset health device.

The first proprietary extension services program receives data from the first proprietary asset health device in the first proprietary data format using the first proprietary API set, converts the data from the first proprietary data format into a common data format, sends the data in the common data format to the common platform services program on the data highway bus, receives commands in a common command format from the common platform services program on the services bus, converts the commands from the common command format to the first proprietary command format, and sends the commands in the first proprietary command format to the first proprietary asset health device using the first proprietary API set.

A common platform applications program communicates with the common platform service program using a common platform API set, receives data in the common data format, originating from the first proprietary device and converted by the first proprietary services program, displays and analyzes the data, receives commands from a user for the first proprietary asset health device, and sends the commands in the common command format to the common platform services program for delivery to the first proprietary asset health device in the first proprietary command format.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

Overview

Figure 1:
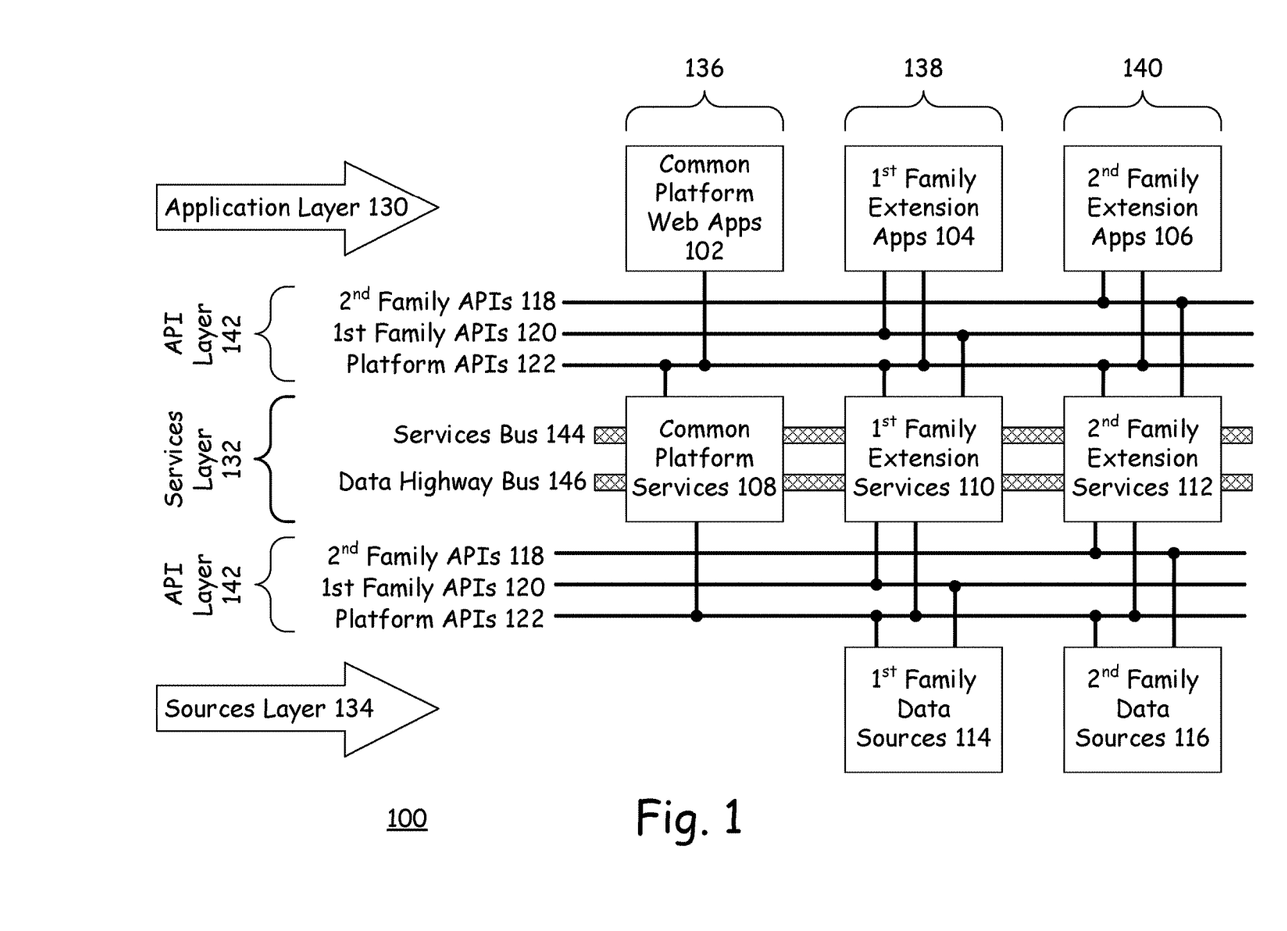
FIG. 1 is a first system diagram of an apparatus according to an embodiment of the present invention.

With reference now to the figures, there is depicted in FIG. 1 a system 100 according to an embodiment of the present convention. The system 100 is an extensible system, in that it provides certain core functionality, but also accepts extension structures consisting of both software and hardware elements. These extension structures can be provided either by the manufacturer of the system 100, or by third party manufactures of various monitoring devices, systems, and software to support the use of their (or someone else's) device within the system 100. As such, a first extension, in some embodiments, supports a first proprietary family of devices, and a second extension supports a second proprietary family of devices, and so forth, and the system 100 provides the structure (both hardware and software) to enable the two families of devices to communicate with the system 100 and with each other. In this manner, the system 100 can unify data services and provide interoperability between proprietary families of devices and other data sources.

The word "proprietary" as used herein does not necessarily mean that a given entity asserts exclusive or otherwise restricted rights in device or communication protocol that it uses. Instead, it is used to indicate that the communication protocol of a first device is at least partially different from—and possibly completely incompatible with—the communication protocol of a second device.

The system 100 can be conceptualized as having four different horizontal layers and at least two different vertical slices. The horizontal layers in the embodiment as depicted in FIG. 1 include an application layer 130, an API layer 142, a services layer 132, another instance of the API layer 142, and a data sources layer 134. The second appearance of the API layer 142 is depicted in FIG. 1 for conceptual convenience, and does not represent a second structure that is physically separate from the first appearance of the API layer 142. The vertical slices include a common Platform slice 136, and two domain-dependent extension slices 138 and 140.

The structures of each layer and each slice include both hardware and software. The part that is software can take many different forms, including code that is more or less permanently resident within a given memory structure, often referred to as firmware. Software can also be loaded into dynamic memory from a storage device, which is more often thought of as programs or software.

Figure 4:
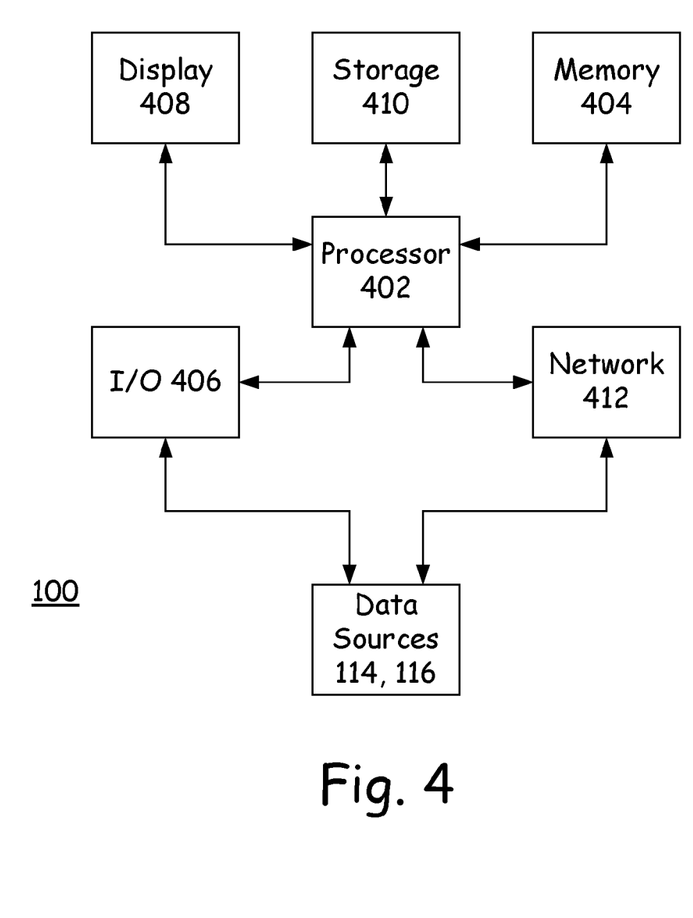
FIG. 4 is a second system diagram of an apparatus according to an embodiment of the present invention.

In some embodiments the hardware is a general purpose computer and accessories (such as depicted in FIG. 4), which may be connected together via a network, including local area networks and wide area networks, such as the Internet. These computing platforms provide structures such as processors 402, data storage 410, memory 404, presentation hardware 408 such as monitors, input/output circuitry 406 such as network connections, USB connections, wireless data services, networking 412, and so forth. In some cases, proprietary and specialized hardware 114 or 116 is contemplated, such as the devices generally described herein.

Vertical Slices

The vertical slices 136, 138, and 140 as depicted in the embodiment of FIG. 1 define the core structure and extension expandability of the system 100. Each vertical slice includes elements of the horizontal application layer 130 and the services layer 132, communicates using the API layer 142, and for the two extension vertical slices 138 and 140, the data sources layer 134.

The vertical slices 138 and 140 are so-called extension structures, and offer equipment, applications, services, and support for various proprietary families of data sources 134. In FIG. 1 there are two such extension families represented by the vertical slices 138 and 140, but it is understood that in other embodiments there is capacity for fewer (as few as one) or additional vertical extension slices.

The common platform vertical slice 136 represents the common applications, hardware, and services that are provided by the system 100, which also use the API layer 142, and have portions that are included in both the application layer 130 and the services layer 132. It includes common services and applications used and extended by the domain-specific extensions 138 and 140. Examples of these services and applications include a common asset hierarchy, user management, authentication and authorization, event logs and messaging. A detailed description of this is provided hereafter.

One feature of the common services 108 and applications 102 is that they can be extended by the domain-specific extensions 138 and 140. For example, an extension would need a way to be launched from the platform, so in one embodiment it would extend a platform application with a "launch me" menu item. Additionally, a domain-specific extension 138 and 140 can extend information in the system 100 by extending or adding new asset classes, and registering event types for messaging.

The domain-specific extensions 138 and 140 provide the system with domain functionally, such as asset vibration, oil analysis, infrared analysis, device configuration and diagnostics, and so forth. One advantage of the system 100 platform providing the basic infrastructure as described above is that the domain-specific systems 138 and 140 can leverage these common services and applications, instead of duplicating them. This provides a standard mechanism to share information between different domain extensions 138 and 140, without them having direct knowledge of one another. This also provides the user with consistency for these common services and applications when there are multiple extensions from a variety of domains.

Horizontal Layers

As introduced above, the horizontal layers include an application layer 130, an API layer 142, a services layer 132, and a data sources layer 134.

Application Layer

The application layer 130 includes applications that provide for the control of various other parts of the system 100, receipt of data that is handled by the system 100, and analysis of the data in the system 100. As indicated in FIG. 1, these applications can be web applications, or in other embodiments, can be traditional applications. Applications 104 and 106 can include applications for asset configuration and analysis, user interfaces to configure the system 100 to channel mappings and device configuration, and so forth. The application layer 130 includes user interface applications for both the common platform 136 and domain-specific 138 and 140 technologies.

API Layer

The API layer 142 includes an API set 122 for the platform vertical slice 136 of the system 100, an API set 120 for the first proprietary extension vertical slice 138, and an API set 118 for the second proprietary extension vertical slice 140. In other embodiments, the API layer 142 contains as many API sets as there vertical extensions, so as additional extension families are added to the system 100, so too are additional API sets added to the API layer 142.

Each vertical domain slices 138 and 140 has its own specific set of APIs 118 and 120 that is used to communication within its vertical slice. This is also true for the common platform vertical slice 136. One difference is that the domain-specific vertical slices 138 and 140 can also communicate via the platform APIs 122 directly with the platform services 108 and applications 102. This is one of the elements that enables the extension system architecture 100 to work.

In some embodiments, the vertical domain slices 138 and 140 do not use each other's APIs directly, but exchange common information via the common platform set of APIs 122, for example, or otherwise as described elsewhere herein.

Furthermore, the APIs are provide in such a way as to allow a domain-specific extension to be written with any programming language and executed on any OS platform.

In some embodiments the APIs 142, in particular the common platform APIs 122, are WEB APIs, which enables a distributed Internet-based architecture for the system 100. The platform APIs 122 provide access to the plant hierarchy and system events, for example. Using the platform APIs 122, extension applications, services, and devices can, in some embodiments, gain access to various system 100 resources, inform the system 100 of their presence and capabilities, and so forth.

Services Layer

The services layer 132 provides an interface between the application layer 130 and the data sources layer 134. It communicates with these other layers through the API layer 142, and provides communicates between the common platform services structure 108 and the extension structures 110 and 112 on the services layer 132 by use of the services bus 144 and data highway bus 146. The service layer 132 provides the underlying functionality of the system 100 that the application layer 130 and asset sources layer 134 use including database storage.

Sources Layer

The data sources layer 134 is where data is either generated or otherwise provided to the system 100. These data sources 134 are designated in the vertical slices 138 and 140 as a first family of data sources 114 and a second family of data sources 116. As introduced above, in one embodiment the software and some of the hardware for a given vertical slice is provided by a third party. The hardware that is provided by a third party is that which might be present in the data sources layer 134, such as proprietary devices that gather data on assets.

The data sources layer 134 is used by the domain-specific technologies 138 and 140 to provide sources of data, to inject devices and data streams into the system 100 for use by the platform 136, and all domain-specific extensions 138 and 140 automatically.

For example, one company might make a family of vibration sensing devices that are built in to, work with, or otherwise gather data from various assets. Typically, devices that gather a similar type of data and are made by a common manufacture use the same API set, and thus communicate well with one another, and tend to work with the same applications. Such a set of devices would, in some embodiments, be a candidate for one of the extension vertical slices in the extensible system 100. The manufacturer of these devices could have his devices and applications make use of the system 100 by providing an extension services structure 110 that provides data and control communication between his data sources 114 (in this case, vibration sensing devices) and his applications 104.

Integration

The extension services structure 110 also provides the data from the devices 114 to the system 100 via a data highway bus 146. In some embodiments, the data provided by the structure 110 provides the data to the data highway bus 146 in a common platform format, even though the data from the first family data sources 114 is, in some embodiments, received by the first family extension services structure 110 in a proprietary format. The extension service structure 110 also has the ability to receive data from other services structures, such as 108 and 112, in the common platform services data format on the data highway bus 146. In this manner, the first family extension services structure 110 makes the data from its devices 114 available to other devices 116 (or other data sources) and applications 136, 138, and 140, and is also able to make data from other vertical slices 140 available to the devices 114 and applications 104 in its own vertical slice. The extension services structures 110 and 112 also provide, in some embodiments, databases to store the data associated with their vertical slices, information in regard to the location and type of data sources that they are servicing, acquisitions and measurement definitions, mapping between the system 100 and the device 114 and 116 channels, and any other device-specific configurations.

Similar to the common data communication provided by the data highway bus 146, the services bus 144 provides commonality of command, responses, and other services between the vertical slices, so that applications and data sources that typically would not be able to communicate one with another in that manner are able to do so.

As introduced above, the data source structures 114 and 116 in the data sources layer 134 can be physical devices, such as proprietary hardware by various manufacturers, but they can alternately (or additionally) include data that is provided to the system 100 on a network communication line from a data repository or other source of asset data.

The data sources 114 and 116 in the data source layer 134 are each connected to and communicate on two API lines, the first being the API line belonging to the associated extension family (the first family APIs 120 for the first family data sources 114, or the second family APIs 118 for the second family data sources), and then also the platform APIs 122.

Embodiment of Common Platform Vertical Slice

Figure 2:
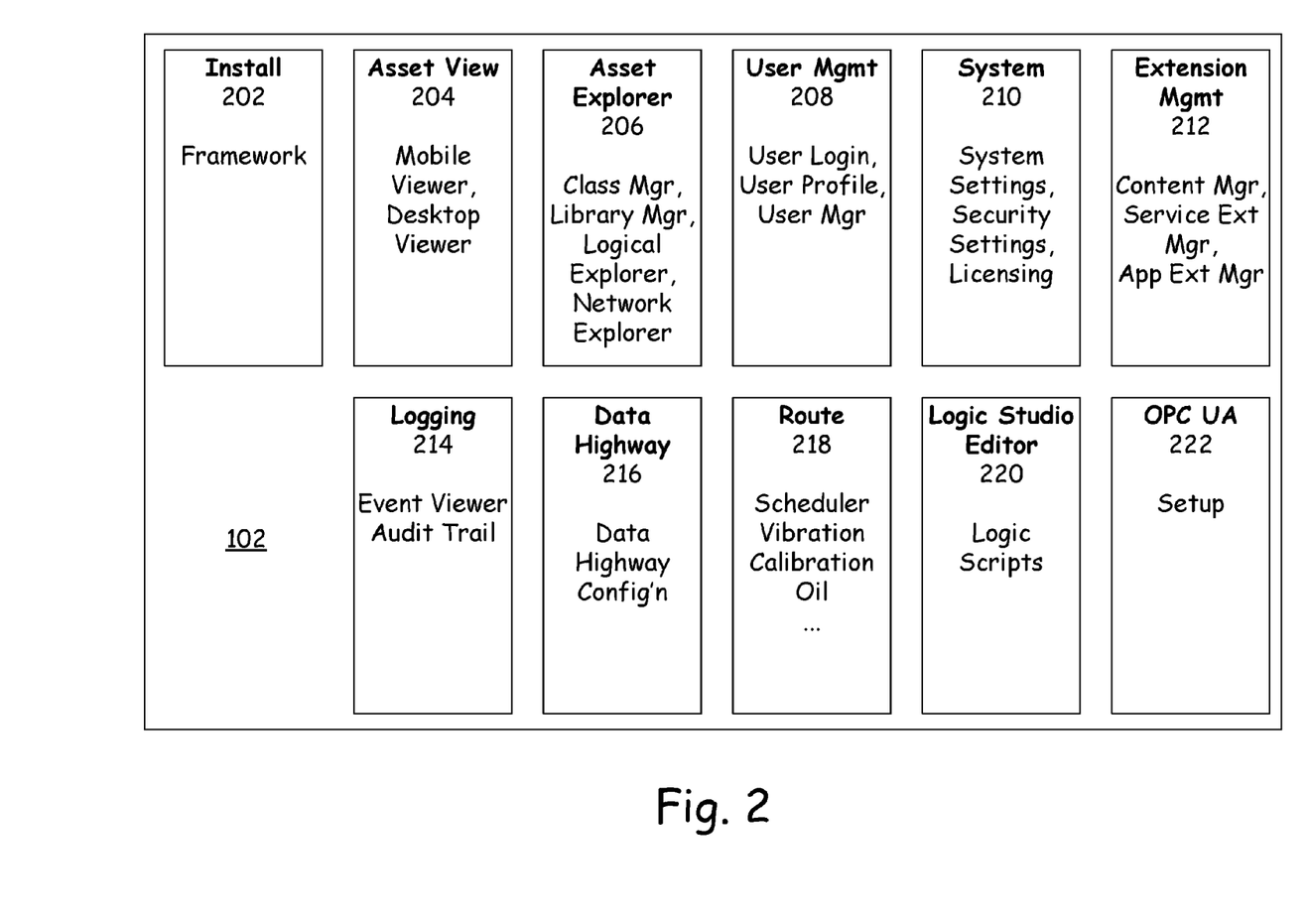
FIG. 2 depicts greater detail in regard to the common platform applications of an apparatus according to an embodiment of the present invention.

With reference now to FIG. 2 there is depicted a more detailed embodiment of the common platform applications 102. In the embodiment depicted, the common platform applications 102 include eleven different structures, including an install structure 202, an asset view structure 204, an asset explorer structure 206, a user management structure 208, a system structure 210, an extension management structure 212, a logging structure 214, a data highway structure 216, a routing structure 218, a logic studio editor structure 220, and an OPC UA structure 222. The common platform applications 102 also include messaging in some embodiments.

The install structure 202 provides information in regard to the basic platform of the system 100. The asset view structure 204 provides a mobile viewer, and a desktop viewer. Some embodiments include a messaging system used by users in a similar way to an email system but limited to messages generated by the domain-specific extensions 138 and 140. Some embodiments also include a desktop application and mobile device applications with similar functionality.

The asset explorer structure 206 provides a class manager, a library manager, a logical explorer, and a network explorer, and provides common asset hierarchies across all extensions. The user management structure 208 provides a user login, user profile creation, and a user manager, and provides a common list of users for all extensions. This enables a single login for users, and the ability to configure user roles and permissions in the system. The system structure 210 provides system settings, security settings, and licensing, and is used to set common system-wide 100 preferences.

The extension management structure 212 provides a content manager, a service extension manager, and an application extension manager. The logging structure 214 provides an event viewer and an audit trail, and provides a single place where all events and audit trail entries can be logged, viewed, and managed. The data highway structure 216 provides configuration and management of the data highway 146, and a common source for data that can be shared across multiple extensions 138 and 140.

The routing structure 218 provides a scheduler, and the ability to schedule collections for vibration data, calibration data, oil data, and any other types of information as gathered by the data sources of the data source layer 134. It is a commonly accessible application that can create ordered lists of items in the system 100, and is used for managing manual data collection for devices 114 and 116 that are compatible.

The logic studio editor structure 220 provides the ability to create logic scripts that automate the various tasks of the system 100, and is a mechanism for creating logic algorithms based on assets and data, and can be used for detailed automatic analysis, among other uses. It is understood that scripting applications other than logic studio could be used in various other embodiments. The OPC UA structure 222 provides for setup of the system 100. OPC stands for OLE process control, were OLE stands for object linking and embedding. UA means unified architecture, which is the latest version of OPC, which is an open sources program that allows certain operating systems to communicate with certain hardware, such as the devices contemplated herein. It is appreciated that a process control language other than OPC could be used in various other embodiments of the system 100.

Figure 3:
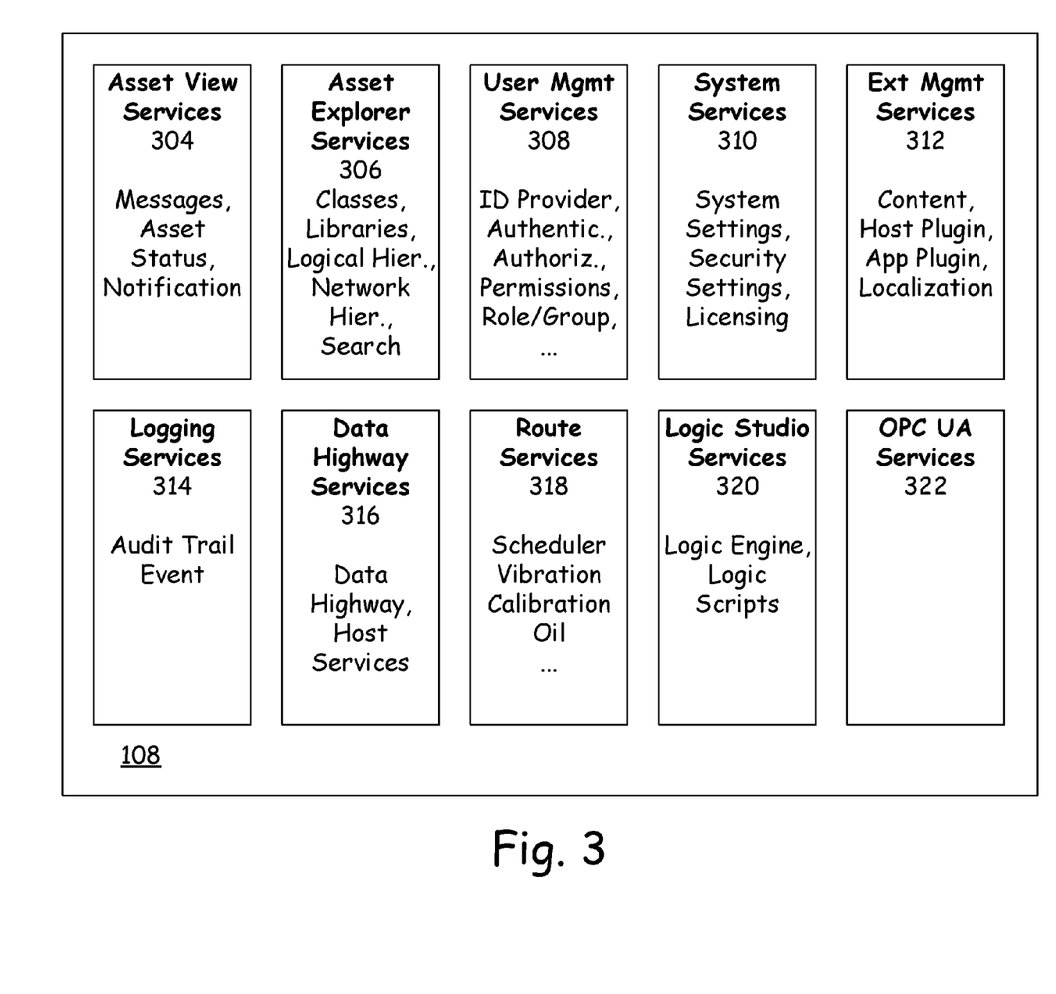
FIG. 3 depicts greater detail in regard to the common platform services of an apparatus according to an embodiment of the present invention.

With reference now to FIG. 3, there is depicted additional detail in regard to the common platform services structure 108. In the embodiment as depicted in FIG. 3, the common platform services structure 108 includes an asset view services structure 304, an asset explorer services structure 306, a user management services structure 308, a system services structure 310, an extension management services structure 312, a logging services structures 314, a data highway services structure 316, a routing services structure 318, a logic studio services structure 320, and an OPC UA services structure 322. The common platform services structure 108 also includes, in some embodiments, items such as facility hierarchy, messaging, and a database to store information in regard to the services that it provides.

In the embodiment as depicted, all except the install structure 202 of the common platform applications structure 102 have counterparts in the common platform services structure 108. In various embodiments the common platform applications 102 provide a unified interface across the system 100. In some embodiments, the asset language services structure 322 communicates with an associated client 324.

Extension Management

In some embodiments, extensions 138 and 140 are defined by an XML schema called Application Definition Language (ADL). When an extension 138 or 140 is installed or updated, the ADL information is parsed and stored within normalized database tables in the common platform services structure 108. The ADL defines the extensions that the extension 138 or 140 would like to add to the system 100. The platform services 108, in turn, uses the ADL to install the extension on behalf of the extension—registering events, permissions, class definitions, and user interface task commands to be include in the common platform applications structure 102, such as in a user interface.

Tasks

Tasks are actions provided by an extension 138 or 140 that can be executed by the system 100. This could be launching an installed program, or opening a web page. In some embodiments, a task in the ADL contains the following: (1) the <Path> node defines the specifics on execution of the task while the event is interpreted, and (2) name and icon for display when included in the user interface. Parameters passed to a task are defined, in some embodiments, in the Paths<Parameter> nodes. These are predefined, named parameters that the system 100 and the extensions 138 and 140 can interpret in order to provide the proper context and data to a task.

Events

A extension 138 or 140 can define a set of events that it is capable of raising. Additionally, the extension 138 or 140 can define whether or not it wants these events to trigger the system's 100 messaging services. One purpose for defining events is so that a user can see a list of the extension's events and, potentially, subscribe to the events.

Class Extensions

A extension 138 or 140 can define the ways in which it wishes to extend known classes. Classes define the items, such as devices, in the data sources 114 or 116, and their properties. Extensions 138 and 140 can add properties to classes, or add new classes with the ADL.

Permissions

In some embodiments, extensions 138 and 140 can define custom permissions that they would like to utilize. How these permissions are utilized, consumed, or understood are reliant on the extensions 138 and 140 to deal with them. In some embodiments, the system 100 doesn't really care about the permissions that it hasn't defined itself.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An extensible computing system for integrating asset health and reliability data from devices made by different manufacturers and also for integrating user communication of the devices made by different manufacturers, the computing system comprising:
 a computer,
 program structures operable on the computer, the program structures including, common platform structures, including,
  a common platform application structure, and
  a common platform services structure, including,
   a services bus for communicating device communication signals in a standardized format from the common platform services structure to a proprietary extension services structure, where the proprietary extension services structure converts the device communication signals from the standardized format to a proprietary communication format that is understood by a proprietary device, and
   a data highway bus for communicating asset health data in a standardized data format from the proprietary extension services structure to the common extension services structure, where the proprietary services structure converts asset health and reliability data from a proprietary data format as received from the proprietary device into the standardized data format,
 an input for communicating data in the proprietary data format from the proprietary device to the computer, and
 an output for sending communication signals in the proprietary communication format to the proprietary device.

2. The extensible computing system of claim 1, further comprising a common platform applications structure for presenting the asset health and reliability data to a user and receiving commands from the user and generating associated communication signals.

3. The extensible computing system of claim 2, further comprising a common platform API set for communicating data and device communication signals between the common platform applications structure and the common platform services structure.

4. The extensible computing system of claim 2, wherein the common platform applications structure comprises an install structure, an asset view structure, an asset explorer structure, a user management structure, a system structure, an extension management structure, a logging structure, a data highway structure, a routing structure, a logic studio structure, and an OPC UA structure.

5. The extensible computing system of claim 1, further comprising a second proprietary extension services structure associated with a second proprietary device, a second proprietary data format, and a second proprietary control format, the second proprietary extension services structure in communication with the common platform services structure on the services bus and the data highway bus.

6. The extensible computing system of claim 1, further comprising a proprietary API set for communicating data and device communication signals between the proprietary extension services structure and the proprietary asset health device.

7. The extensible computing system of claim 1, wherein the common platform services structure comprises an asset view services structure, an asset explorer services structure, a user management services structure, a system services structure, an extension management services structure, a logging services structures, a data highway services structure, a routing services structure, a logic studio services structure, and an OPC UA services structure.

8. A non-transient, computer-readable medium containing an extensible asset health program for enabling a computer to communicate with proprietary asset health devices, the extensible asset health program comprising:
a common platform services program for establishing a services bus and a data highway bus,
a selectively removable first proprietary extension services program associated with a first proprietary API set, a first proprietary data format, a first proprietary command format, and a first proprietary asset health device, the first proprietary extension services program for,
receiving data from the first proprietary asset health device in the first proprietary data format using the first proprietary API set,
converting the data from the first proprietary data format into a common data format,
sending the data in the common data format to the common platform services program on the data highway bus,
receiving commands in a common command format from the common platform services program on the services bus,
converting the commands from the common command format to the first proprietary command format, and
sending the commands in the first proprietary command format to the first proprietary asset health device using the first proprietary API set,
a common platform applications program for,
communicating with the common platform service program using a common platform API set,
receiving data in the common data format, originating from the first proprietary device and converted by the first proprietary services program,
displaying and analyzing the data,
receiving commands from a user for the first proprietary asset health device, and
sending the commands in the common command format to the common platform services program for delivery to the first proprietary asset health device in the first proprietary command format.

9. The non-transient, computer-readable medium of claim 8, further comprising a selectively removable second proprietary extension services program associated with a second proprietary API set, a second proprietary data format, a second proprietary command format, and a second proprietary asset health device, the second proprietary extension services program in communication with the common platform services program on the services bus and the data highway bus.

10. The non-transient, computer-readable medium of claim 8, wherein the common platform applications program comprises at least one of an install program, an asset view program, an asset explorer program, a user management program, a system program, an extension management program, a logging program, a data highway program, a routing program, a logic studio program, and an OPC UA program.

11. The non-transient, computer-readable medium of claim 8, wherein the common platform services program comprises at least one of an asset view services program, an asset explorer services program, a user management services program, a system services program, an extension management services program, a logging services programs, a data highway services program, a routing services program, a logic studio services program, and an OPC UA services program.

12. A method for enabling a computer to communicate with proprietary asset health devices, the method comprising the steps of:
providing a common platform services program for establishing a services bus and a data highway bus,
providing a selectively removable first proprietary extension services program associated with a first proprietary API set, a first proprietary data format, a first proprietary command format, and a first proprietary asset health device, the first proprietary extension services program for,
receiving data from the first proprietary asset health device in the first proprietary data format using the first proprietary API set,
converting the data from the first proprietary data format into a common data format,
sending the data in the common data format to the common platform services program on the data highway bus,
receiving commands in a common command format from the common platform services program on the services bus,
converting the commands from the common command format to the first proprietary command format, and
sending the commands in the first proprietary command format to the first proprietary asset health device using the first proprietary API set,
providing a common platform applications program for,
communicating with the common platform service program using a common platform API set,
receiving data in the common data format, originating from the first proprietary device and converted by the first proprietary services program,
displaying and analyzing the data, receiving commands from a user for the first proprietary asset health device, and
sending the commands in the common command format to the common platform services program for delivery to the first proprietary asset health device in the first proprietary command format.

13. The method of claim 12, further comprising providing a selectively removable second proprietary extension services program associated with a second proprietary API set, a second proprietary data format, a second proprietary command format, and a second proprietary asset health device, the second proprietary extension services program in communication with the common platform services program on the services bus and the data highway bus.

14. The method of claim 12, wherein the common platform applications program comprises at least one of an install program, an asset view program, an asset explorer program, a user management program, a system program, an extension management program, a logging program, a data highway program, a routing program, a logic studio program, and an OPC UA program.

15. The method of claim 12, wherein the common platform services program comprises at least one of an asset view services program, an asset explorer services program, a user management services program, a system services program, an extension management services program, a logging services programs, a data highway services program, a routing services program, a logic studio services program, and an OPC UA services program.

* * * * *